(12) United States Patent
Chang et al.

(10) Patent No.: US 9,108,367 B2
(45) Date of Patent: Aug. 18, 2015

(54) METHOD FOR MANUFACTURING CONTACT LENSES AND CONTACT LENSES MANUFACTURED THEREFROM

(71) Applicant: BenQ Materials Corporation, Taoyuan County (TW)

(72) Inventors: Mei-Yun Chang, Taoyuan County (TW); Jui-Feng Chung, Taoyuan County (TW)

(73) Assignee: BENQ MATERIALS CORPORATION, Taoyuan (TW)

( * ) Notice: Subject to any disclaimer, the term of this patent is extended or adjusted under 35 U.S.C. 154(b) by 483 days.

(21) Appl. No.: 13/729,040

(22) Filed: Dec. 28, 2012

(65) Prior Publication Data

US 2013/0300010 A1 Nov. 14, 2013

(30) Foreign Application Priority Data

May 11, 2012 (TW) .............................. 101116791 A

(51) Int. Cl.
*B29D 11/00* (2006.01)
*G02B 1/04* (2006.01)

(52) U.S. Cl.
CPC .......... *B29D 11/00038* (2013.01); *G02B 1/043* (2013.01)

(58) Field of Classification Search
CPC . B29D 11/00038; G02B 1/043; C08L 101/14
See application file for complete search history.

(56) References Cited

U.S. PATENT DOCUMENTS

2012/0220743 A1* 8/2012 Francis et al. ................ 526/279

FOREIGN PATENT DOCUMENTS

| JP | 2009014977 A | 1/2009 |
|---|---|---|
| TW | 285677 | 9/1996 |
| TW | 201116585 A | 5/2011 |
| TW | 201122618 A | 7/2011 |

* cited by examiner

*Primary Examiner* — Daniel McNally
(74) *Attorney, Agent, or Firm* — CKC & Partners Co., Ltd.

(57) ABSTRACT

The invention provides a method for manufacturing contact lenses, including: (a) mixing a siloxane macromer represented by formula (I), a siloxane macromer represented by formula (II), a hydrophilic monomer, a crosslinking agent and an initiator to form a mixture for manufacturing contact lenses, wherein the mixture for manufacturing contact lenses is free of solvent; and (b) injecting the mixture into a mould of contact lenses and conducting a UV irradiating treatment or a thermal treatment to form contact lenses, wherein formula (I) and formula (II) are shown in following:

formula (I)

$$H_2C=\overset{H}{\underset{}{C}}-\overset{O}{\underset{}{C}}-O-(R_3)_4-\left[\underset{R_1}{\overset{R_1}{\underset{|}{Si}}}-O\right]_m-\underset{R_2}{\overset{R_2}{\underset{|}{Si}}}-(R_3)_4-O-\overset{O}{\underset{}{C}}-\overset{H}{\underset{}{C}}=CH_2,$$

formula (II)

$$R_4-\underset{R_5}{\overset{R_5}{\underset{|}{Si}}}-O-\left[\underset{R_6}{\overset{R_6}{\underset{|}{Si}}}-O\right]_n-\underset{R_7}{\overset{R_7}{\underset{|}{Si}}}-C_3H_6-O-\overset{O}{\underset{}{C}}-\overset{CH_3}{\underset{}{C}}=CH_2,$$

in formula (I), R1, R2 and R3 are C1-C4 alkyl groups and m is an integer of 10-40, and in formula (II), R4, R5 and R6 are C1-C4 alkyl groups or alcohol groups, R7 is a C1-C4 alkyl group, and n is an integer of 10-130. Also provided are the contact lenses manufactured from the method.

18 Claims, No Drawings

METHOD FOR MANUFACTURING CONTACT LENSES AND CONTACT LENSES MANUFACTURED THEREFROM

CROSS-REFERENCE TO RELATED APPLICATION

This application claims the priority benefit of Taiwan Application Serial No. 101116791, filed May 11, 2012, the full disclosure of which is incorporated herein by reference.

BACKGROUND

1. Technical Field

The present invention relates to a method for manufacturing contact lenses; more particularly, the present invention relates to a method for manufacturing contact lenses having excellent oxygen permeability and water content without using solvent.

2. Description of Related Art

Contact lenses can be generally classified into two categories, soft contact lenses and hard contact lenses, and the soft contact lenses can be further classified into hydrogel contact lenses and silicon hydrogel contact lenses.

The hydrogel contact lenses are made from hydrogel materials, such as poly-2-hydroxyethyl methacrylate (p-HEMA). The strength of 2-hydroxyethyl methacrylate can be enhanced by adding crosslinking agent like ethylene glycol dimethacrylate (EGDMA). Since the water content of the p-HEMA is only about 38.8%, one or more than one kinds of hydrophilic monomers, for example N-vinylpyrrolidone, N,N-dimethylacrylamide and methyl acrylic acid, are added to enhance the water content of such materials. With the addition of the hydrophilic monomer, the water content of the contact lenses can increase from 38% up to 80%. However, the higher water content of the contact lenses is, the lower tension and toughness thereof become. Thus, the water content of the contact lenses is generally controlled in the ranges from about 45% to 58 On the other hand, the real oxygen permeability (DK) of the contact lenses can only reach about 15-35 regardless any improvement of the water content thereof.

When wearing contact lenses with higher oxygen permeability, wearers feel more comfortable because sufficient oxygen will be permeated through the contact lenses from the environment air to reach the cornea of the wearers. In general, there are three methods for increasing oxygen permeability (DK) of contact lenses: (1) thinning the thickness of contact lenses; (2) using material with high water content; and (3) using material with high oxygen permeability. However, the above-mentioned methods (1) and (2) will decrease mechanical strength of the contact lenses.

In addition, the synthesis method of silicon hydrogel and hydrogel can be processed by thermal-reaction and UV-reaction depending on the initiators used respectively. Generally, the reaction time of thermal-reactive silicon hydrogel is about 2-3 hours and the reaction temperature is about 100-120° C. It took time to mold the contact lenses, and mass evaporation of the solvent during the molding process resulted in unexpected surface texture on the contact lenses.

Therefore, the present invention is to provide a method for manufacturing contact lenses to eliminate the aforesaid disadvantages of the prior art.

SUMMARY

According to an aspect of the present invention, a method for manufacturing contact lenses is provided.

In an embodiment of the method of the present invention, the method for manufacturing contact lenses comprises: (a) mixing a siloxane macromer represented by the following formula (I), a siloxane macromer represented by the following formula (II), a hydrophilic monomer, a crosslinking agent and an initiator to form a mixture; and (b) injecting the mixture into a mold of contact lens and conducting a UV irradiating treatment or a thermal treatment to the mixture to form contact lenses; wherein the siloxane macromer of formula (I) and the siloxane macromer of formula (II) are as follows:

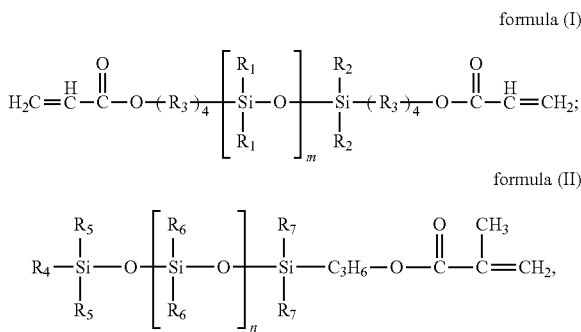

where, in formula (I), R1, R2 and R3 are independently C1-C4 alkyl groups and m is an integer of 10-40, and in formula (II), R4, R5 and R6 are independently C1-C4 alkyl groups or alcohol groups, R7 is a C1-C4 alkyl group and n is an integer of 10-130. Moreover, the hydrophilic monomer is selected from a group consisting of N-vinylpyrrolidone (NVP), 2-hydroxyethyl methacrylate (HEMA), dimethylaminoethyl methacrylate (DMA), glycerol monomethacrylate (GMMA), methyl acrylic acid (MAA), methyl methacrylate (MMA), glycidyl methacrylate (GMA), acrylic acid, (methyl) acrylamide, N,N-dimethylacrylamide, ethylene carbonate, vinyl bamate and a combination thereof.

According to a further aspect of the present invention, a contact lens obtained by the method mentioned above is provided.

The above and other aspects of the invention will become better understood with regard to the following detailed description of the preferred but non-limiting embodiment(s).

DETAILED DESCRIPTION

Accordingly, a method for manufacturing contact lenses and a contact lens manufactured by the same are provided. In the following detailed description, for purposes of explanation, numerous specific details are set forth in order to provide a thorough understanding of the disclosed embodiments. It will be apparent, however, that one or more embodiments may be practiced without these specific details.

According to an aspect of the present invention, a mixture for manufacturing contact lenses is provided, and the mixture is free of solvent. The contact lenses made from the mixture have excellent oxygen permeability and high water content. In addition, the mixture is free of solvent which will decrease manufacturing cost and make the manufacturing process simpler.

In an embodiment of the present invention, the mixture for manufacturing contact lenses comprises a siloxane macromer represented by the following formula (I), a siloxane macromer represented by the following formula (II), a hydrophilic monomer, an initiator and a crosslinking agent, wherein the formula (I) and formula (II) are shown as follows:

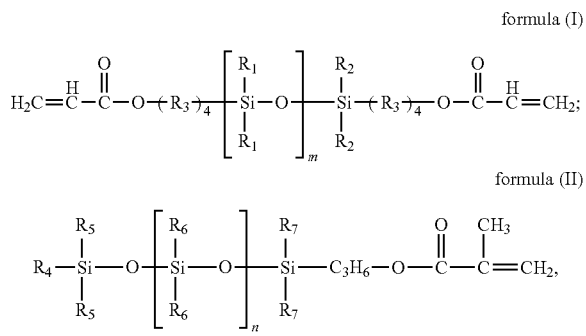

formula (I)

formula (II)

in formula (I), R1, R2 and R3 are independently C1-C4 alkyl groups and m is an integer of 10-40, and in formula (II), R4, R5 and R6 are independently C1-C4 alkyl groups or alcohol groups, R7 is a C1-C4 alkyl group and n is an integer of 10-130.

The hydrophilic monomer can be but not limited to N-vinylpyrrolidone (NVP), 2-hydroxyethyl methacrylate (HEMA), dimethylaminoethyl methacrylate (DMA), glycerol monomethacrylate (GMMA), methyl acrylic acid (MAA), methyl methacrylate (MMA), glycidyl methacrylate (GMA), acrylic acid, (methyl) acrylamide, N,N-dimethylacrylamide, ethylene carbonate, vinyl bamate or a combination thereof.

In an embodiment of the present invention, in the mixture for manufacturing contact lenses, the siloxane macromer of formula (I) defined as above is present at an amount of 1 to 10 parts by weight, the siloxane macromer of formula (II) defined as above is present at an amount of 30 to 60 parts by weight, the hydrophilic monomer is present at an amount of 30 to 65 parts by weight, the crosslinking agent is present at an amount of 0.05 to 2 parts by weight and the initiator is present at an amount of 0.1 to 1 parts by weight based on the total amount of the mixture.

In an embodiment of the present invention, the siloxane macromer of formula (I) comprises but not limited to a siloxane macromer represented by the following formula (III):

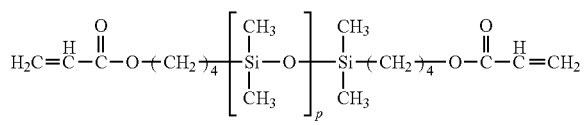

formula (III)

wherein p is an integer of 10-40. In an embodiment of the present invention, the molecular weight of the siloxane macromer of formula (III) is about 3300.

In an embodiment of the present invention, the siloxane macromer of formula (II) comprises but not limited to a siloxane macromer represented by the following formula (IV):

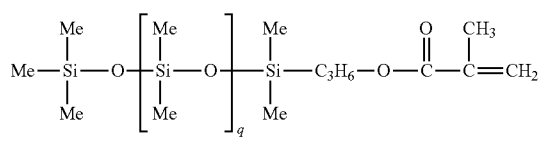

formula (IV)

wherein q is an integer of 10-130. In an embodiment of the present invention, the molecular weight of the siloxane macromer of formula (IV) is about 1000.

In an embodiment of the present invention, the hydrophilic monomer is a combination of N-vinylpyrrolidone (NVP) and 2-hydroxyethyl methacrylate (HEMA). In another embodiment of the present invention, the hydrophilic monomer is a combination of N-vinylpyrrolidone (NVP), 2-hydroxyethyl methacrylate (HEMA) and dimethylaminoethyl methacrylate (DMA).

Besides, the crosslinking agent suitably used in conventional mixtures for manufacturing contact lenses can be used in the present invention, such as, for example, ethylene glycol dimethacrylate (EGDMA), trimethylolpropane triacrylate (TMPTA), tetraethylene ethylene glycol dimethacrylate (TEGDMA), tetraethylene ethylene glycol dimethacrylate (TrEGDMA), Poly(ethylene glycol) dimethacrylate, trimethylolpropane trimethacrylate, vinyl methacrylate, ethylenediamine dimethyl acrylamide, glycerol dimethacrylate, triallyisoeyanurate or triallyl cyanurate.

Additionally, the initiator suitably used in conventional mixtures for manufacturing contact lenses can be used in the present invention. The initiator can be a photoinitiator or a thermal initiator. The suitable photoinitiator can be but not limited to, such as, for example, 2,4,6-trimethylbenzoyl diphenyl oxide, 2-hydroxy-2-methylpropiophenone, ethyl (2,4,6-trimethylbenzoyl) phenylphosphinate or 2,2-diethoxyacetophenone. The suitable thermal initiator can be but not limited to, such as, for example, azobisisoheptonitrile (ADVN), 2,2'-azobis(isoheptonitrile) (AIBN), 2,2'-azobis(2,4-dimethylvaleronitrile), 2,2'-azobis(2-methyl-propanenitrile), 2,2'-azobis(2-methyl-butanenitrile) or benzoyl peroxide.

In an embodiment of the present invention, the initiator is a photoinitiator and the hydrophilic monomer is a combination of HEMA and NVP. In this embodiment, the siloxane monomer of formula (I) is present at an amount of 5 to 10 parts by weight, the siloxane monomer of formula (II) is present at an amount of 30 to 50 parts by weight, the NVP is present at an amount of 20 to 55 parts by weight, the HEMA is present at an amount of 10 to 25 parts by weight, the crosslinking agent is present at an amount of 0.1 to 1 parts by weight and the photoinitiator is present at an amount of 0.2 to 1 parts by weight, and the total amount of NVP and HEMA is between 30 and 65 parts by weight based on the total amount of the mixture.

In another embodiment of the present invention, the initiator is a thermal initiator and the hydrophilic monomer is a combination of NVP, HEMA and DMA. In this embodiment, the siloxane monomer of formula (I) is present at an amount of 1 to 10 parts by weight, the siloxane monomer of formula (II) is present at an amount of 30 to 60 parts by weight, the NVP is present at an amount of 20 to 60 parts by weight, the HEMA is present at an amount of 3 to 25 parts by weight, the DMA is present at an amount of 0.5 to 5 parts by weight, the crosslinking agent is present at an amount of 0.05 to 2 parts by weight and the thermal initiator is present at an amount of 0.1 to 1 parts by weight, and the total amount of NVP, HEMA and DMA is between from 30 to 65 parts by weight based on the total amount of the mixture.

In addition, the mixture for manufacturing contact lenses can further comprise but not limited to a dye and an UV-blocking agent. In an embodiment of the present invention, the mixture further comprises a dye and/or an UV-blocking agent. In this embodiment, the siloxane monomer of formula (I) is present at an amount of 1 to 10 parts by weight, the siloxane monomer of formula (II) is present at an amount of 30 to 60 parts by weight, the hydrophilic monomer is present at an amount of 30 to 65 parts by weight, the crosslinking agent is present at an amount of 0.05 to 2 parts by weight, the initiator is present at an amount of 0.1 to 1 parts by weight and the dye and/or the UV-blocking agent is present at an amount of 0.01 to 1 parts by weight based on the total amount of the mixture.

According to a further aspect of the present invention, a method for manufacturing contact lenses is provided, and the method is without using solvent. The contact lenses made by the present method have excellent oxygen permeability and high water content. In addition, because the method is free of solvent, the manufacturing cost is decreased and the manufacturing process is simplified. The present method can comprise but not limited to the following steps.

Firstly, a siloxane macromer represented by the following formula (I), a siloxane macromer represented by the following formula (II), a hydrophilic monomer, a crosslinking agent and an initiator are mixed to form a mixture, wherein the siloxane macromer of formula (I) and the siloxane macromer of formula (II) are shown as follows:

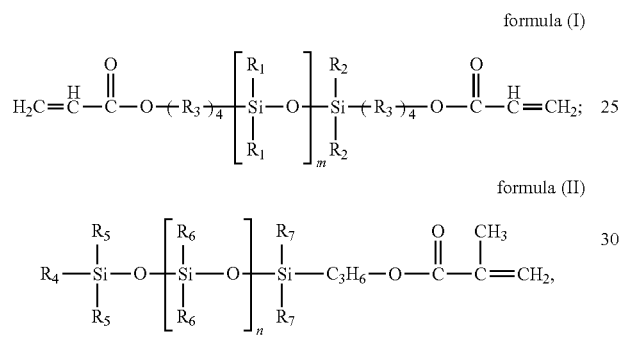

in formula (I), R1, R2 and R3 are independently C1-C4 alkyl groups and m is an integer of 10-40, and in formula (II), R4, R5 and R6 are independently C1-C4 alkyl groups or alcohol groups, R7 is a C1-C4 alkyl group and n is an integer of 10-130;

The hydrophilic monomer is selected from a group consisting of N-vinylpyrrolidone (NVP), 2-hydroxyethyl methacrylate (HEMA), dimethylaminoethyl methacrylate (DMA), glycerol monomethacrylate (GMMA), methyl acrylic acid (MAA), methyl methacrylate (MMA), glycidyl methacrylate (GMA), acrylic acid, (methyl) acrylamide, N,N-dimethylacrylamide, ethylene carbonate, vinyl bamate and a combination thereof. In an embodiment of the method of the present invention, the hydrophilic monomer is a combination of HEMA and NVP. In another embodiment of the method of the present invention, the hydrophilic monomer is a combination of HEMA, DMA and NVP.

In the mixture for manufacturing contact lenses which is formed by the above mentioned steps, the siloxane macromer of formula (I) is present at an amount of 1 to 10 parts by weight, the siloxane macromer of formula (II) is present at an amount of 30 to 60 parts by weight, the hydrophilic monomer is present at an amount of 30 to 65 parts by weight, the crosslinking agent is present at an amount of 0.05 to 2 parts by weight and the initiator is present at an amount of 0.1 to 1 parts by weight based on the total amount of the mixture.

In an embodiment of the present invention, in the step of forming the mixture further comprises: a siloxane macromer of formula (I) defined as above, a siloxane macromer of formula (II) defined as above, a hydrophilic monomer and a crosslinking agent are mixed to form a first mixture, and the first mixture is stirred until the first mixture becomes transparent, then an initiator is mixed to the transparent first mixture to form the mixture for manufacturing contact lenses.

In an embodiment of the method of the present invention, the siloxane macromer of formula (I) comprises but not limited to a siloxane macromer represented by the following formula (III):

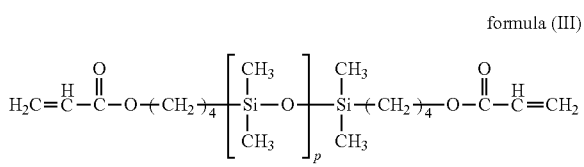

wherein p is an integer of 10-40. In an embodiment of the method of the present invention, the molecular weight of the siloxane macromer of formula (III) is about 3,300.

In an embodiment of the method of the present invention, the siloxane macromer of formula (II) comprises but not limited to a siloxane macromer represented by the following formula (IV):

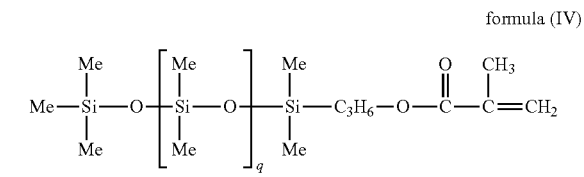

wherein q is an integer of 10-130. In an embodiment of the method of the present invention, the molecular weight of the siloxane macromer of formula (IV) is about 1,000.

In an embodiment of the method of the present invention, the hydrophilic monomer is a combination of N-vinylpyrrolidone (NVP) and 2-hydroxyethyl methacrylate (HEMA). In another embodiment of the method of the present invention, the hydrophilic monomer is a combination of N-vinylpyrrolidone (NVP), 2-hydroxyethyl methacrylate (HEMA) and dimethylaminoethyl methacrylate (DMA).

Furthermore, the crosslinking agent suitably used in conventional materials for manufacturing contact lenses can be used in the present invention, such as, for example, ethylene glycol dimethacrylate (EGDMA), trimethylolpropane triacrylate (TMPTA), tetraethylene ethylene glycol dimethacrylate (TEGDMA), tetraethylene ethylene glycol dimethacrylate (TrEGDMA), Poly(ethylene glycol) dimethacrylate, trimethylolpropane trimethacrylate, vinyl methacrylate, ethylenediamine dimethyl acrylamide, glycerol dimethacrylate, triallyisoeyanurate or triallyl cyanurate.

Additionally, the initiator suitably used in conventional materials for manufacturing contact lenses can be used in the present invention. The initiator can be a photoinitiator or a thermal initiator. The suitable photoinitiator can be but not limited to, such as, for example, 2,4,6-trimethylbenzoyl diphenyl oxide, 2-hydroxy-2-methylpropiophenone, ethyl (2,4,6-trimethylbenzoyl)phenylphosphinate or 2,2-diethoxyacetophenone. The suitable thermal initiator can be but not limited to, such as, for example, azobisisoheptonitrile (ADVN), 2,2'-azobis(isoheptonitrile) (AIBN), 2,2'-azobis(2,4-dimethylvaleronitrile), 2,2'-azobis(2-methyl-propanenitrile), 2,2'-azobis(2-methyl-butanenitrile) or benzoyl peroxide.

In an embodiment of the method of the present invention, the initiator is a photoinitiator and the hydrophilic monomer is a combination of HEMA and NVP. In this embodiment, the siloxane monomer of formula (I) is present at an amount of 5 to 10 parts by weight, the siloxane monomer of formula (II) is present at an amount of 30 to 50 parts by weight, the NVP is present at an amount of 20 to 55 parts by weight, the HEMA is present at an amount of 10 to 25 parts by weight, the crosslinking agent is present at an amount of 0 to 1 parts by weight and the photoinitiator is present at an amount of 0.2 to 1 parts by weight, and the total amount of NVP and HEMA is between 30 and 65 parts by weight based on the total amount of the mixture.

In another embodiment of the method of the present invention, the initiator is a thermal initiator and the hydrophilic monomer is a combination of NVP, HEMA and DMA. In this embodiment, the siloxane monomer of formula (I) is present at an amount of 1 to 10 parts by weight, the siloxane monomer of formula (II) is present at an amount of 30 to 60 parts by weight, the NVP is present at an amount of 20 to 60 parts by weight, the HEMA is present at an amount of 3 to 25 parts by weight, the DMA is present at an amount of 0.5 to 5 parts by weight, the crosslinking agent is present at an amount of 0.05 to 2 parts by weight and the thermal initiator is present at an amount of 0.1 to 1 parts by weight, and the total amount of NVP, HEMA and DMA is between from 30 to 65 parts by weight based on the total amount of the mixture.

In addition, in the step of forming the mixture for manufacturing contact lenses, the mixture can further comprise other materials selectively, the material can be but not limited to a dye and an UV-blocking agent.

In an embodiment of the method of the present invention, the mixture further comprises mixing a dye and/or an UV-blocking agent. In this embodiment, the siloxane monomer of formula (I) is present at an amount of 1 to 10 parts by weight, the siloxane monomer of formula (II) is present at an amount of 30 to 60 parts by weight, the hydrophilic monomer is present at an amount of 30 to 65 parts by weight, the crosslinking agent is present at an amount of 0.05 to 2 parts by weight, the initiator is present at an amount of 0.1 to 1 parts by weight and the dye and/or the UV-blocking agent is present at an amount of 0 01 to 1 parts by weight based on the total amount of the mixture. In this embodiment, the method for formulating the mixture for manufacturing contact lenses comprises the steps of: mixing a siloxane macromer of formula (I), a siloxane macromer of formula (II), a hydrophilic monomer and a crosslinking agent to form a first mixture and stirring the first mixture until the first mixture becomes transparent, then adding a dye and/or an UV-blocking agent into the first mixture and mixing thoroughly to form a second mixture, and then adding an initiator into the second mixture and mixing thoroughly to form the mixture for manufacturing contact lenses.

In the method of the present invention, after the step of formulating the mixture, the mixture is injected into a mold of contact lens and conducted a UV irradiating treatment or a thermal treatment to form contact lenses.

In an embodiment of the method of the present invention, an accumulated energy during the UV irradiating treatment is about 1500-8000 mj/cm$^2$.

In an embodiment of the method of the present invention, the thermal treatment is conducted at a temperature between 55° C. and 140° C. for 1-6 hours. In an embodiment of the method of the present invention, the reaction condition of the treatment is but not limit to: at 60° C. for 1 hour, at 80° C. for 2 hours and then, at 135° C. for 2 hours. After forming contact lenses, the method of the present invention can further comprise a hydration treatment. In an embodiment of the method of the present invention, the hydration treatment comprises but not limited to the following steps.

Firstly, the contact lens is immersed in an alcohol solution, and then, the contact lens is immersed in water. After that, the contact lens is immersed in a buffer solution to obtain equilibrium.

According to a further another aspect of the present invention, a contact lens obtained by the method mentioned above is provided.

The oxygen permeability of the contact lenses according to the present invention is more than 80, and preferably more than 200.

The water content of the contact lenses according to the present invention is greater than 30%.

While the invention has been described by way of example(s) and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

EXAMPLE

Example 1

Using photoinitiator to prepare contact lenses without solvent

A. The Preparation Steps of Example 1-1 to Example 1-3

1. A first siloxane macromer, a second siloxane macromer, a N-vinylpyrrolidone (NVP), a 2-hydroxyethyl methacrylate (HEMA) and a ethylene glycol dimethacrylate (EGDMA) were mixed to form a mixture in a 20 ml sample bottle, the mixture was stirred about 10 minutes until the mixture became transparent, then a dye was added and stirred about 10-15 minutes. After the dye was dissolved, a photoinitiator, 2,4,6-trimethylbenzoyl diphenyl oxide (TPO), was added and stirred about 15 minutes to form a mixture for manufacturing contact lenses. The compositions of Example 1-1 to Example 1-3 are shown in Table 1 respectively. Wherein, the first siloxane macromer is represented by the following (III), and the molecular weight of which is about 3,300:

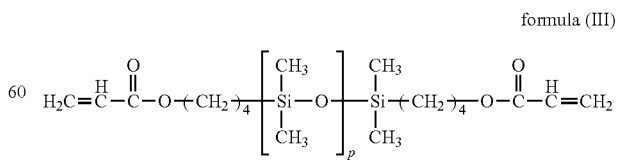

formula (III)

The second siloxane macromer is represented by the following (IV), and the molecular weight of which is about 1,000:

formula (IV)

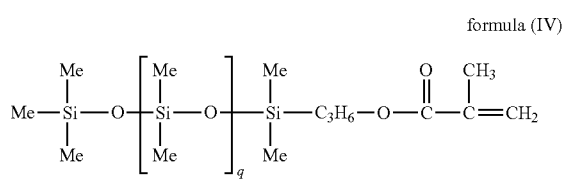

2. Nitrogen was introduced to the prepared mixture for manufacturing contact lens for 10 minutes.

3. After nitrogen was introduced, the mixture for manufacturing contact lens was injected into a mold of contact lens made of polypropylene (PP) and an UV irradiating treatment was conducted for 24 minutes, and an accumulated energy during the UV irradiating treatment was about 1,500-8,000 mj/cm$^2$.

4. After the curing was completed, a hydration treatment and a sterilizing treatment were conducted on the lens. The steps and the conditions of hydration treatment and sterilizing treatment were as follows.

The steps of hydration treatment of the contact lens were:
(a) immersing the lens with mold in 90% alcohol solution for 60 minutes, and then the resulting molded lens was taken out of the mold;
(b) immersing the resulting molded lens in 90% alcohol solution for 60 minutes;
(c) heating the alcohol-immersed lens in water at 80° C. for 1 hour; and
(d) immersing the lens in a buffer solution for 12 hours to reach equilibrium.

The condition of sterilizing treatment was at 121° C. for 30 minutes.

B. Physical Property Tests of Example 1-1 to Example 1-3

The results of physical property tests of Example 1-1 to Example 1-3 of the present invention were shown as the following Table 1.

TABLE 1

The composition of contact lenses and the result of physical test of Example 1-1-Example 1-3

| Item | Example 1-1 | Example 1-2 | Example 1-3 |
|---|---|---|---|
| First siloxane macromer (g) | 0.3 | 0.3 | 0.3 |
| Second siloxane macromer (g) | 2 | 2.6 | 2.6 |
| NVP (g) | 2.15 | 1.55 | 1.55 |
| HEMA (g) | 0.700 | 0.700 | 0.700 |
| EGDMA (g) | 0.013 | 0.026 | 0.026 |
| Dye (g) | 0.0025 | 0.002 | 0.02 |
| Photoinitiator (g) | 0.03 | 0.005 | 0.005 |
| Water content (%) | 61.4 | 38.8 | 35.1 |
| Modulus (Mpa) | 0.21 | 0.71 | 0.57 |
| Tension (%) | 37 | 53 | 41 |
| Extension (g) | 122 | 47 | 35 |
| Surface texture | None | None | None |
| DK | 88.38 | 201.14 | 156.4 |

The contact lenses of Example 1-1 to Example 1-3 according to the present invention are free of solvent and all have high oxygen permeability which are more than 88. Moreover, the oxygen permeability of example 1-2 is even up to 200. Besides, the water content of example 1-1 to 3-1 are greater than 35%.

Example 2

Using thermal initiator to prepare contact lenses without solvent

A. The Preparation Steps of Example 2-1 to Example 2-6

1. A first siloxane macromer, a second siloxane macromer, a N-vinylpyrrolidone (NVP), a 2-hydroxyethyl methacrylate (HEMA), a dimethylaminoethyl methacrylate (DMA), a crosslinking agent ethylene glycol dimethacrylate (EGDMA), an UV-blocking agent, a dye and a thermal initiator, azobisisoheptonitrile (ADVN), were mixed and stirred for about 1 hour to form a mixture for manufacturing contact lenses. The compositions of Example 2-1 to Example 2-6 are shown in Table 2 respectively. Wherein, the first siloxane macromer is represented by the following (III), and the molecular weight of which is about 3,300:

formula (III)

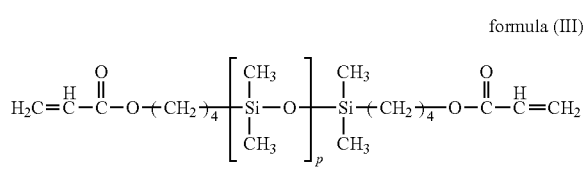

The second siloxane macromer is represented by the following (IV), and the molecular weight of which is about 1,000:

formula (IV)

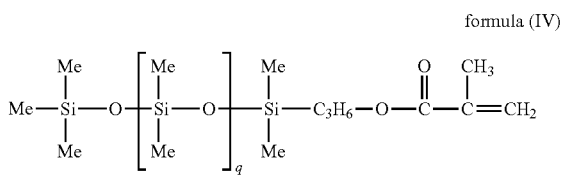

2. The mixture for manufacturing contact lens was injected into a mold of contact lens made of polypropylene (PP) and was placed in a programmable oven, a thermal treatment was conducted at 60° C. for 1 hour, at 80° C. for 2 hours and then, at 135° C. for 2 hours.

3. After the curing was completed, the resulting lens was conducted a hydration treatment and a sterilizing treatment on the lens. The steps and the conditions of hydration treatment and sterilizing treatment were as follows:

The steps of hydration treatment of the contact lens were
(a) immersing the lens with mold in 80% alcohol solution for 1 hour then the resulting molded lens was taken out of the mold;
(b) immersing the resulting molded lens in 90% alcohol solution for 1 hour;
(c) heating the alcohol-immersed lens in water at 80° C. for 1 hour; and
(d) immersing the lens in a buffer solution for 12 hours to reach equilibrium.

The condition of sterilizing treatment was at 121° C. for 30 minutes.

B. Physical Property Tests of Example 2-1 to Example 2-6

The results of physical property tests of Example 2-1 to Example 2-6 of the present invention were shown as the following Table 2.

TABLE 2

The composition of contact lenses and the result of physical test of Example 2-1-Example 2-6

| Item | Example 2-1 | Example 2-2 | Example 2-3 | Example 2-4 | Example 2-5 | Example 2-6 |
|---|---|---|---|---|---|---|
| First Silicon macromer (g) | 0.3 | 0.3 | 0.3 | 0.45 | 0.55 | 0.75 |
| Second silicon macromer (g) | 2 | 2.3 | 2.6 | 2 | 2 | 2 |
| NVP (g) | 2.15 | 1.85 | 1.55 | 2 | 1.9 | 1.7 |
| DMA (g) | 0.3 | 0.3 | 0.3 | 0.3 | 0.3 | 0.3 |
| HEMA (g) | 0.7 | 0.7 | 0.7 | 0.7 | 0.7 | 0.7 |
| UV-blocking agent (g) | 0.35 | 0.35 | 0.35 | 0.35 | 0.35 | 0.35 |
| Crosslinking agent(g) | 0.01 | 0.01 | 0.01 | 0.01 | 0.01 | 0.01 |
| Thermal initiator (g) | 0.03 | 0.03 | 0.03 | 0.03 | 0.03 | 0.03 |
| Dye (g) | 0.005 | 0.005 | 0.005 | 0.005 | 0.005 | 0.005 |
| Solvent | 0 | 0 | 0 | 0 | 0 | 0 |
| Water content (%) | 55.27 | 43.32 | 41.58 | 43.70 | 39.96 | 36.30 |
| Modulus (MPa) | 0.3925 | 0.65 | 0.64 | 0.47 | 0.61 | 0.61 |
| Tension (%) | 68.5 | 57 | 83 | 42 | 37.33 | 35 |
| Extension (g) | 109 | 62 | 84 | 55.5 | 41.6 | 36 |
| Surface texture | None | None | None | None | None | None |
| DK | 140 | 157.8 | 165.7 | 160.13 | 144 | 155.8 |

The contact lenses of Example 2-1 to Example 2-6 according to the present invention are free of solvent and all have high oxygen permeability which are more than 140. Moreover, the water content of Examples 2-1 to Example 2-6 are all greater than 35%, the water content of Example 2-1 is high water content and even up to 55%.

While the invention has been described by way of example(s) and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for manufacturing contact lenses comprising the steps of:
   (a) mixing a siloxane macromer represented by the following formula (I), a siloxane macromer represented by the following formula (II), a hydrophilic monomer, a crosslinking agent and an initiator to form a mixture; and
   (b) injecting the mixture into a mold of contact lens and conducting a UV irradiating treatment or a thermal treatment to the mixture to form contact lenses;
   wherein the siloxane macromer of formula and the siloxane macromer of formula (II) are:

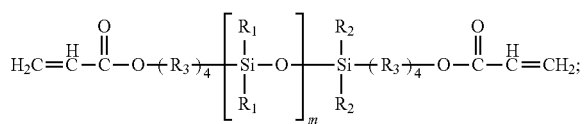

formula (I)

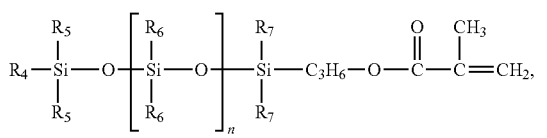

formula (II)

where, in formula (I), R1, R2 and R3 are independently C1-C4 alkyl groups and m is an integer of 10-40, and in formula (II), R4, R5 and R6 are independently C1-C4 alkyl groups or alcohol groups, R7 is a C1-C4 alkyl group and n is an integer of 10-130; and the hydrophilic monomer is selected from the group consisting of N-vinylpyrrolidone (NVP), 2-hydroxyethyl methacrylate (HEMA), dimethylaminoethyl methacrylate (DMA), glycerol monomethacrylate (GMMA), methyl acrylic acid (MAA), methyl methacrylate (MMA), glycidyl methacrylate (GMA), acrylic acid, (methyl) acrylamide, N,N-dimethylacrylamide, ethylene carbonate, vinyl bamate and a combination thereof.

2. A method for manufacturing contact lenses according to claim 1, wherein the initiator is a photoinitiator which is selected from the group consisting of 2,4,6-trimethylbenzoyl diphenyl oxide, 2-hydroxy-2-methylpropiophenone, ethyl (2,4,6-trimethylbenzoyl)phenylphosphinate and 2,2-diethoxyacetophenone.

3. A method for manufacturing contact lenses according to claim 2, wherein the hydrophilic monomer is a combination of HEMA and NVP.

4. A method for manufacturing contact lenses according to claim 3, wherein the siloxane monomer of formula (I) is present at an amount of 5 to 10 parts by weight, the siloxane monomer of formula (II) is present at an amount of 30 to 50 parts by weight, the NVP is present at an amount of 20 to 55 parts by weight, the HEMA is present at an amount of 10 to 25 parts by weight, the crosslinking agent is present at an amount of 0.1 to 1 parts by weight and the photoinitiator is present at an amount of 0.2 to 1 parts by weight, wherein the total amount of NVP and HEMA is between 30 and 65 parts by weight based on the total amount of the mixture.

5. A method for manufacturing contact lenses according to claim 1, wherein the initiator is a thermal initiator which is selected from the group consisting of azobisisoheptonitrile (ADVN), 2,2'-azobis(isoheptonitrile) (AIBN), 2,2'-azobis(2,4-dimethylvaleronitrile), 2,2'-azobis(2-methyl-propanenitrile), 2,2'-azobis(2-methyl-butanenitrile) and benzoyl peroxide.

6. A method for manufacturing contact lenses according to claim 5, wherein the hydrophilic monomer is a combination of NVP, HEMA and DMA.

7. A method for manufacturing contact lenses according to claim 6, wherein the siloxane monomer of formula (I) is present at an amount of 1 to 10 parts by weight, the siloxane monomer of formula (II) is present at an amount of 30 to 60 parts by weight, the NVP is present at an amount of 20 to 60 parts by weight, the HEMA is present at an amount of 3 to 25 parts by weight, the DMA is present at an amount of 0.5 to 5 parts by weight, the crosslinking agent is present at an amount of 0.05 to 2 parts by weight and the thermal initiator is present at an amount of 0.1 to 1 parts by weight, wherein the total amount of NVP, HEMA and DMA is between from 30 to 65 parts by weight based on the total amount of the mixture.

8. A method for manufacturing contact lenses according to claim 1, wherein the siloxane macromer of formula (I) comprises a siloxane macromer represented by the following formula (II):

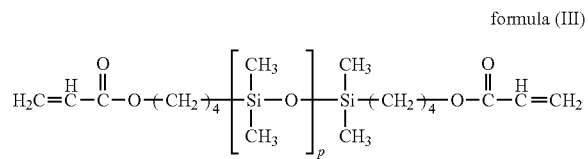

formula (III)

wherein p is an integer of 10-40.

9. A method for manufacturing contact lenses according to claim 8, wherein the molecular weight of the siloxane macromer of formula (III) is 3,300.

10. A method for manufacturing contact lenses according to claim 1, wherein the siloxane macromer of formula (II) comprises a siloxane macromer represented by the following formula (IV):

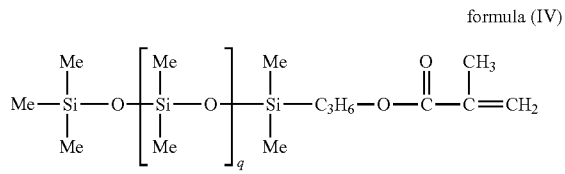

formula (IV)

wherein q is an integer of 10-130.

11. A method for manufacturing contact lenses according to claim 10, wherein the molecular weight of the siloxane macromer of formula (IV) is 1,000.

12. A method for manufacturing contact lenses according to claim 1 further comprising the step of (c): conducting a hydration treatment after the step of (b).

13. A method for manufacturing contact lenses according to claim 12, the hydration treatment comprising the steps of:

(i) immersing the contact lens in an alcohol solution;

(ii) immersing the contact lens in water; and (iii) immersing the contact lens in a buffer solution to reach equilibrium.

14. A method for manufacturing contact lenses according to claim 1, wherein the siloxane macromer of formula (I) is present at an amount of 1 to 10 parts by weight, the siloxane macromer of formula (II) is present at an amount of 30 to 60 parts by weight, the hydrophilic monomer is present at an amount of 30 to 65 parts by weight, the crosslinking agent is present at an amount of 0.05 to 2 parts by weight and the initiator is present at an amount of 0,1 to 1 parts by weight based on the total amount of the mixture.

15. A method for manufacturing contact lenses according to claim 1, wherein the crosslinking agent is selected from the group consisting of ethylene glycol dimethacrylate (EGDMA), trimethylolpropane triacrylate (TMPTA), tetraethylene ethylene glycol dimethacrylate (TEGDMA), tetraethylene ethylene glycol dimethacrylate (TrEGDMA), Poly (ethylene glycol) dimethacrylate, trimethylolpropane trimethacrylate, vinyl methacrylate, ethylenediamine dimethyl acrylamide, glycerol dimethacrylate, triallyisoeyanurate and triallyl cyanurate.

16. A method for manufacturing contact lenses according to claim 1, wherein in the step of (b), an accumulated energy during the UV irradiating treatment is about 1,500-8,000 mj/cm$^2$.

17. A method for manufacturing contact lenses according to claim 1, wherein in the step of (b), the thermal treatment is conducted at a temperature between 55° C. and 140° C. for 1-6 hours.

18. A contact lens which is obtained by the method for manufacturing contact lenses according to claim 1.

* * * * *